US012659367B2

(12) United States Patent
Chin

(10) Patent No.: US 12,659,367 B2
(45) Date of Patent: Jun. 16, 2026

(54) VIDEO TRANSMISSION METHOD THROUGH DYNAMIC DISPATCHING MPDUs AMONG MULTI-LINKS

(71) Applicant: MEDIATEK INC., Hsin-Chu (TW)

(72) Inventor: Yi-Lon Chin, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 24 days.

(21) Appl. No.: 18/585,010

(22) Filed: Feb. 22, 2024

(65) Prior Publication Data

US 2025/0274501 A1     Aug. 28, 2025

(51) Int. Cl.
| *H04L 65/80* | (2022.01) |
| *H04L 47/24* | (2022.01) |
| *H04L 65/70* | (2022.01) |

(52) U.S. Cl.
CPC .............. H04L 65/80 (2013.01); H04L 47/24 (2013.01); H04L 65/70 (2022.05)

(58) Field of Classification Search
CPC .......... H04L 65/80; H04L 47/24; H04L 65/70
See application file for complete search history.

(56) References Cited

U.S. PATENT DOCUMENTS

| 2013/0202025 A1* | 8/2013 | Baron ..................... H04N 19/37 |
| | | 375/240.02 |
| 2014/0032777 A1* | 1/2014 | Yuan ....................... H04L 67/55 |
| | | 709/231 |

| 2015/0055537 A1* | 2/2015 | Shao ........................ H04L 45/24 |
| | | 370/312 |
| 2021/0105859 A1* | 4/2021 | Hsu ......................... H04L 1/1614 |
| 2022/0353016 A1* | 11/2022 | Jauh ........................... H04L 1/04 |
| 2022/0394796 A1* | 12/2022 | Yu .......................... H04W 76/16 |
| 2023/0097059 A1* | 3/2023 | Zhang ................... H04L 1/1864 |
| | | 370/329 |
| 2023/0155784 A1* | 5/2023 | Chang ................... H04W 76/15 |
| | | 370/329 |
| 2023/0156864 A1* | 5/2023 | Hsu ........................ H04L 69/324 |
| | | 370/329 |
| 2023/0318758 A1* | 10/2023 | Ajami ................... H04L 1/1614 |
| | | 370/329 |
| 2023/0362975 A1* | 11/2023 | Hirata ................. H04W 72/566 |
| 2024/0049308 A1* | 2/2024 | Xue ........................... G06T 7/20 |
| 2024/0098016 A1* | 3/2024 | Chen ..................... H04L 1/1825 |
| 2024/0178931 A1* | 5/2024 | Zhang ................... H04L 5/0044 |
| 2024/0276405 A1* | 8/2024 | Hirata ............... H04W 28/0278 |

FOREIGN PATENT DOCUMENTS

CN          114339903 A  *  4/2022

* cited by examiner

*Primary Examiner* — Oanh Duong
(74) *Attorney, Agent, or Firm* — Winston Hsu

(57)          ABSTRACT

A video transmission method for transmitting video data through a plurality of links includes when at least one predetermined condition related to the plurality of links is met, dispatching a plurality of MAC (Media Access Control) protocol data units (MPDUs) including video data to generate a plurality of physical protocol data units (PPDUs) to be transmitted through the plurality of links, the sequence numbers of a plurality of MPDUs in each PPDU are non-sequential, transmitting the plurality of PPDUs through the plurality of links.

20 Claims, 11 Drawing Sheets

200

Recovery Rate = 0%

500

Link 1

Link 2

VIDEO TRANSMISSION METHOD THROUGH DYNAMIC DISPATCHING MPDUs AMONG MULTI-LINKS

BACKGROUND

Video streaming over wireless networks is compelling for many applications, ranging from home entertainment to surveillance to search-and-rescue operations. Interesting technical challenges arise when the unpredictable nature of the wireless radio channel meets the requirements of high data rate and low latency for video transport.

Most video streams are compressed with predicted based encoding standard (H.264/advanced video coding (AVC)) to reduce data rate. Video packet lost may cause users to get degraded video quality. Some video block cannot successfully be decoded or recovered due to consecutive video block lost.

SUMMARY

An embodiment provides a video transmission method for transmitting video data through a plurality of links including when at least one predetermined condition related to the plurality of links is met, dispatching a plurality of MAC (Media Access Control) protocol data units (MPDUs) including video data to generate a plurality of physical protocol data units (PPDUs) to be transmitted through the plurality of links, the sequence numbers of a plurality of MPDUs in each PPDU are non-sequential, transmitting the plurality of PPDUs through the plurality of links.

Another embodiment provides an apparatus for transmitting video data through a plurality of links. The apparatus may include a transceiver configured to communicate wirelessly and a processor coupled to the transceiver. The processer is configured to perform operations comprising: when at least one predetermined condition related to the plurality of links is met, dispatching a plurality of Media Access Control (MAC) protocol data units (MPDUs) including video data to generate a plurality of physical protocol data units (PPDUs) to be transmitted through the plurality of links, wherein sequence numbers of a plurality of MPDUs in each PPDU are non-sequential; transmitting, via the transceiver, the plurality of PPDUs through the plurality of links.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
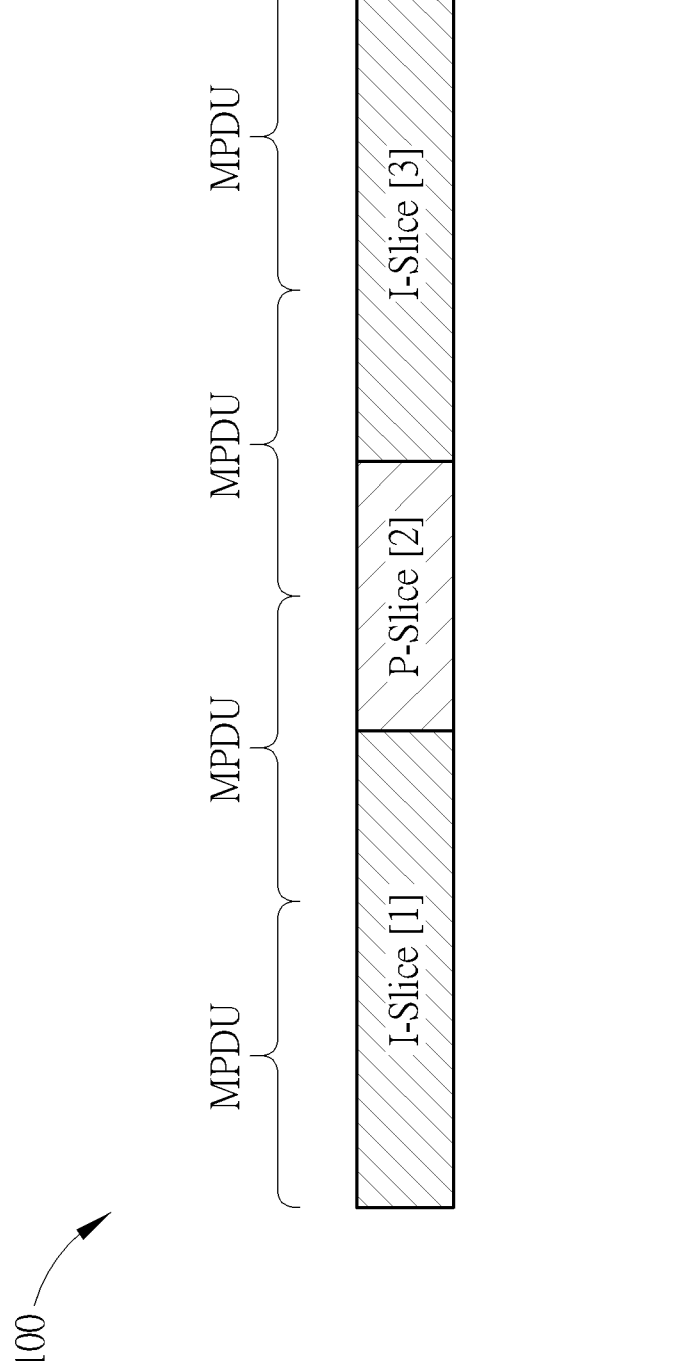
FIG. 1 is an exemplary allocation of MPDUs according to an embodiment of the present disclosure.

In video encoding and compression, a video stream is typically composed of a sequence of frames, which can be divided into smaller segments known as slices. These slices are groups of macroblocks that can be independently encoded. Slices are particularly useful for error resilience and parallel processing. There are three main types of slices used in modern video codecs like H.264/AVC (Advanced Video Coding), H.265/HEVC (High Efficiency Video Coding), and others: intra-slices (I-slices), predictive slices (P-slices), and bi-directional predictive slices (B-slices). Specifically, I-slices may contain macroblocks that are encoded using only information within the same slice. In other words, I-slices can be decoded without any reference to other frames or slices. I-slices are used as reference points for decoding subsequent slices and are essential for random access points in the video stream, such as when starting playback or secking to a new position. P-slices contain macroblocks that may be encoded using motion-compensated prediction from previous frames or slices (also referred to as reference frames). A P-slice can refer to blocks from one or more previously decoded I or P slices to predict the content of its macroblocks, which helps to reduce the amount of data needed to represent them. B-slices can use both past and future frames or slices for motion-compensated prediction. This means that a B-slice can refer to macroblocks from both earlier and later I or P slices in the video sequence to predict its content.

In the procedure of video transmission through multiple links, the medium access control (MAC) service data units (MSDUs) including video data (for example, video slices) may be transmitted from the network layer to a MAC layer, then the transmitter may pack the MSDUs as an aggregated-MSDU (A-MSDU) and encapsulate the MSDUs or A-MSDU as MAC protocol data unit (MPDU) at the MAC layer. In addition, the transmitter may also encapsulate MPDUs into physical protocol data units (PPDUs) at the physical (PHY) layer and transmit them to the receiver through the multiple links. The focus of present disclosure is on dynamic dispatching of MPDUs for video data transmission across multiple links based on various conditions in the process of generating PPDUs. For example, when at least one predetermined condition related to the plurality of links is met, the transmitter may deliberately dispatch a plurality of MPDUS including video data to generate a plurality of PPDUs to be transmitted through the plurality of links, wherein the sequence numbers of MPDUs within each PPDU among the generated PPDUs are non-sequential. The proposed approach allows for flexibility in transmission scheduling based on various conditions, rather than always generating PPDUs in the order of MPDUs' sequence numbers (SNs), thereby enhancing the quality of video transmission and facilitating the effective recovery of failed video data. In one embodiment, upon the detection of a continuous error pattern on any one of the multiple links, the transmitter is configured to alternately dispatch MPDUs to be transmitted, which contain video data, among different PPDUs which will be transmitted on different links. This results in the sequence numbers of MPDUs within each PPDU being arranged in an alternating or interleaving fashion. Conversely, in an alternative embodiment, if a discrete error pattern is identified across the links, the transmitter is configured to construct PPDUs in direct accordance with the sequence numbers of the MPDUs, wherein the sequence numbers of the MPDUs within each PPDU are in a sequential order. This adaptive strategy enables the transmitter to optimize data transmission based on the conditions of the communication links between the transmitter and a corresponding receiver.

Moreover, the present disclosure introduces a method for encapsulating MSDUs of individual video slice into a single MPDU, thus enables the assignment of a specific priority to each MPDU, which is determined based on or associated with the characteristics of the video slice it encapsulates. This prioritization allows for further dynamic dispatching MPDUs based on the transmission priorities of the MPDUs to be transmitted, which in turn further improves the transmission quality and recovery rate of the video data. For example, such prioritization facilitates dynamic dispatching MPDUs in accordance with their respective transmission priorities in combination with transmission conditions of links, thereby enhancing the overall transmission quality and increasing the likelihood of successful video data recovery.

For illustrative purposes, the transmission methodology of the present disclosure is demonstrated utilizing a dual-link configuration. However, it is important to note that the scope of the present disclosure is not confined to this dual-link configuration. The inventive concept is readily scalable to systems comprising three or more communication links. These links may operate over various frequency bands, which include, but are not limited to, 2.4 GHz, 5 GHZ, and 6 GHz bands.

FIG. 1 is an exemplary allocation of MPDUs according to an embodiment of the present disclosure. An MPDU, which may also be referred to as a packet, constitutes the basic unit of data transmission within a Physical Protocol Data Unit (PPDU). For instance, a single PPDU may encapsulate multiple MPDUs. It should be noted that only the payload portion of PPDU is depicted in the accompanying figures for illustrative purposes, and numerals (for example, 1, 2, . . . , 7, 8) are used to indicate the sequence numbers of the MPDUs. In the depicted exemplary allocation 100 of FIG. 1, MPDUs are constructed to contain equivalent quantities of video data. Notably, the demarcation of these MPDUs does not coincide with the boundaries of the video slices. Video slices may be categorized into Intra-slices (I-slices), predictive slices (P-slices), and bi-directional predictive slices (B-slices). As described above, given the video encoding dependencies, the relative importance of these slices in video transmission is typically ranked as I-slices being the most critical, followed by P-slices, and then B-slices. Therefore, the importance of slices in video transmission is I-slices>P-slices>B-slices. In FIG. 1, the demarcation or boundary of MPDU is independent with the type of video slices. In one conventional transmission scheme, MPDUs with sequential or continuous sequence numbers are always aggregated into a single PPDU. Consequently, this conventional approach to MPDU generation and transmission does not consider the segmentation of the underlying video content.

Figure 2:
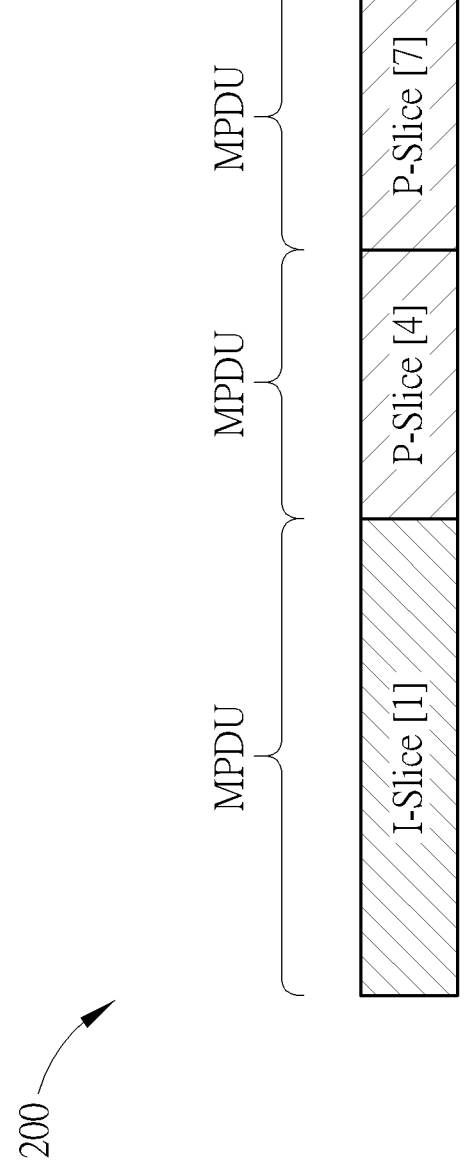
FIG. 2 is an allocation of MPDUs according to another embodiment of the present disclosure.

FIG. 2 is an allocation of MPDUs according to an embodiment of the present disclosure. In the allocation 200 of FIG. 2, the boundary of MAC protocol data units (MPDUs) is the same as those of video slices. Similarly, MPDUs can be assigned corresponding transmission priority. In this way, the transmission and dispatching of MPDUs can be based on the types or priorities of video slices. In the embodiment, a plurality of MAC service data units (MSDUs) corresponding to a single video slice are encapsulated into a same (single) MPDU. That is, a set of MSDUs, each associated with the same video slice, are aggregated and encapsulated into a single MPDU. This encapsulation process is performed by the transmission mechanism, which may be embodied as a Wi-Fi driver or a similar module within the transmitter. Specifically, the construction of MPDUs can be based on the boundaries of the video slices and/or the average size of the video slices, wherein the boundaries of the video slices may delineate the start and end points of slices within the video stream. To determine these boundaries, the MSDUs themselves may include metadata that specifies the slice boundary information. This metadata is essential for the accurate reconstruction of the video content at the receiver. Hence, information regarding the slice boundaries can be obtained from the MSDUs. Furthermore, the transmitter may also utilize the average size of the video slices to optimize the encapsulation process. The average size of the video slices can be determined based on size metrics that are available to the video receiver post-decoding. Once the receiver decodes the video slices and determines their sizes, it can communicate this information back to the transmitter. This feedback allows the transmitter to dynamically adjust the MPDU generation process, taking into account the actual sizes of the slices as they are received and decoded by the receiver. By employing this feedback, the transmitter can enhance the efficiency of the data transmission, ensuring that the MPDUs are constructed in a manner that aligns with the current characteristics of the video stream, thereby facilitating a more reliable and effective video communication.

As described above, it can be understood that the importance of slices in video transmission should be I-slices>P-slices>B-slices. Hence, in an embodiment where the video slices include I-slices, P-slices, and B-slices, the priority categories for MPDUs or video slices may include high, medium, and low. In other words, MPDUs corresponding to I-slices are assigned a high priority, MPDUs corresponding to P-slices are assigned a medium priority, and MPDUs corresponding to B-slices are assigned a low priority, but the invention is not limited thereto. In another embodiment, there may be two priority categories: high and low. For example, an MPDU corresponding to a relatively high priority video slice (such as I-slice) is assigned a high priority, and an MPDU corresponding to a relatively low priority video slice (such as P-slice and B-slice) is assigned a low priority.

In one embodiment, when the transmission conditions of multiple links differ significantly (e.g., when the difference of transmission conditions among the multiple links exceeds a threshold), MPDUs with relatively high priority are dispatched on the link with a better transmission condition, and MPDUs with relatively low priority are dispatched on the link with a poorer transmission condition. In an alternative embodiment, when the transmission conditions among the multiple links are relatively uniform or similar (e.g., when the difference of transmission conditions among the multiple links is below a threshold), high-priority MPDUs are dispatched evenly across the multiple links. The parameters for evaluating the transmission conditions include, but are not limited to, the packet error rate (PER) and/or the received signal strength indicator (RSSI), and following embodiments are illustrated using PER as an exemplary criterion for illustrative purposes.

Figure 3:
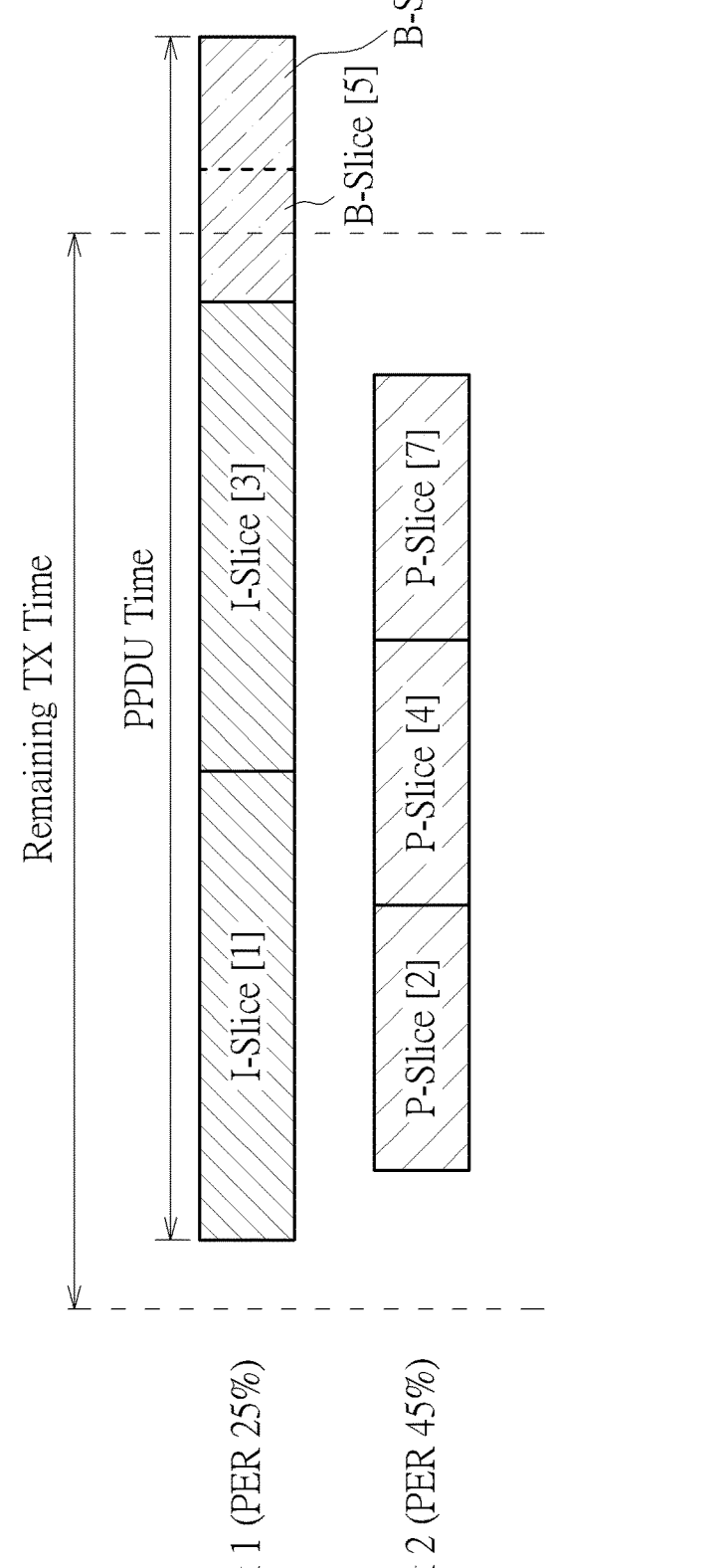
FIG. 3 shows a transmission method through dynamic dispatching MPDUs among multi-links according to an embodiment of the present disclosure.

FIG. 3 shows a transmission method 300 through dynamic dispatching MPDUs among multi-links according to an embodiment of the present disclosure. In a particular embodiment, when the remaining transmission time across the multiple links is deemed inadequate or insufficient for transmitting the entire set of MPDUs pending transmission, at least one MPDU corresponding to a low priority video slice (for instance, a B-slice with lowest priority) may be excluded from generation within the PPDUs. In FIG. 3, Link 1 has a packet error rate (PER) of 25%, and Link 2 has a PER of 45%. The lower the PER, the better the link. Assuming a threshold of 15%, the difference of transmission conditions between the two links exceeds the threshold, thus MPDUs corresponding to a high priority video slice are preferentially dispatched in better link (such as Link 1). In this embodiment, the MPDUs corresponding to a low priority video slice (such as B-Slice [5] and B-Slice [6]) are not generated in PPDUs because the remaining transmission (TX) time in current frame exchange is not enough. As shown in FIG. 3, the current frame exchange ends after the second I-slice and the two B-slices are discarded, but it should be noted that each of the two B-slices may be recovered by other slices sent. In a preferred embodiment, a block acknowledgement request (BAR) frame may be deliberately sent on the better link (such as Link 1) after the generated PPDUs transmitted, to force the receiver to refresh its reorder buffer, and terminate or conclude the transmission of MPDUs within the current frame exchange, and enter the next frame exchange. P-slices which carry information more important than the B-slices but less important than I-slices are dispatched in a poorer link (such as Link 2), and the transmission of P-slices can be completed during the remaining transmission time. In this way, the important information carried by I-slices and P-slices is transmitted, and the less important information carried by the B-slices is discarded during transmission because the TX time is not enough, then the BAR frame may be deliberately sent on the better link.

Figure 4A:
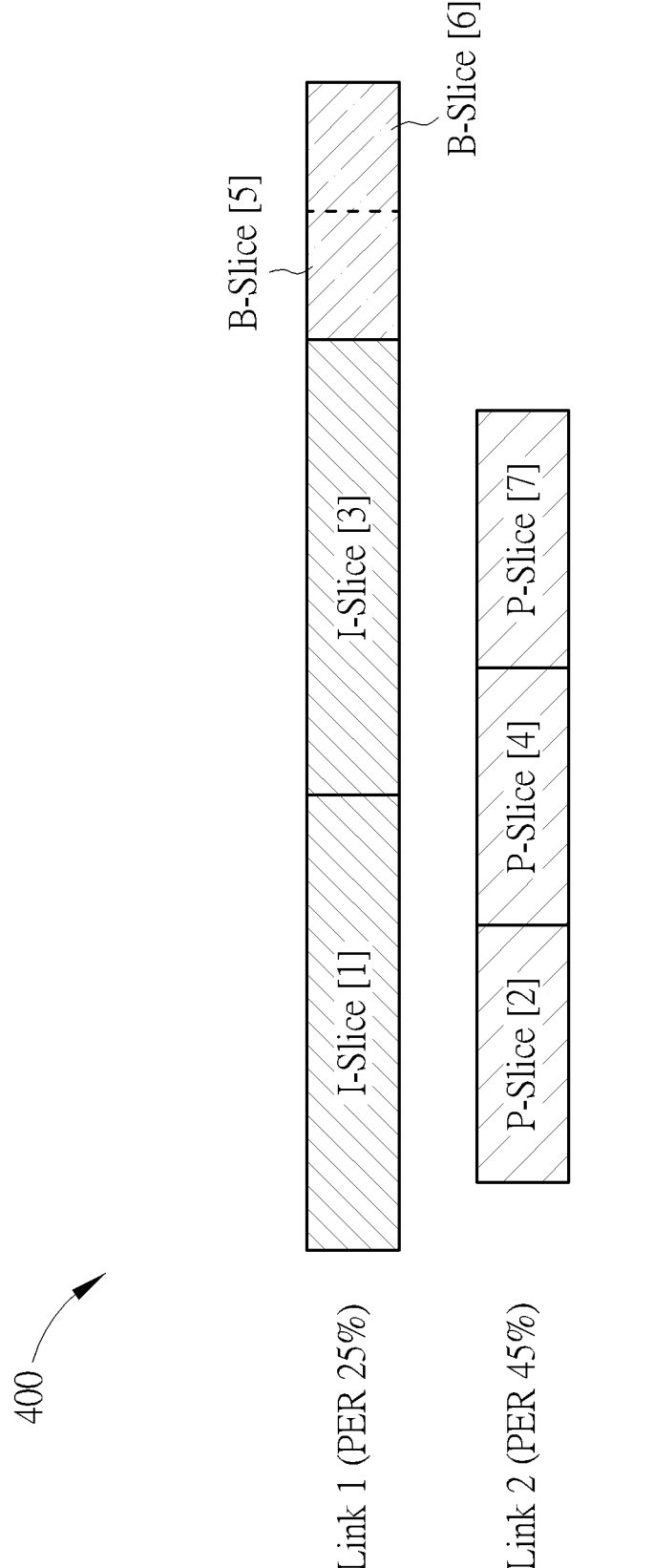
FIG. 4A shows a transmission method through dynamic dispatching MPDUs among multi-links according to another embodiment of the present disclosure.
Figure 4B:
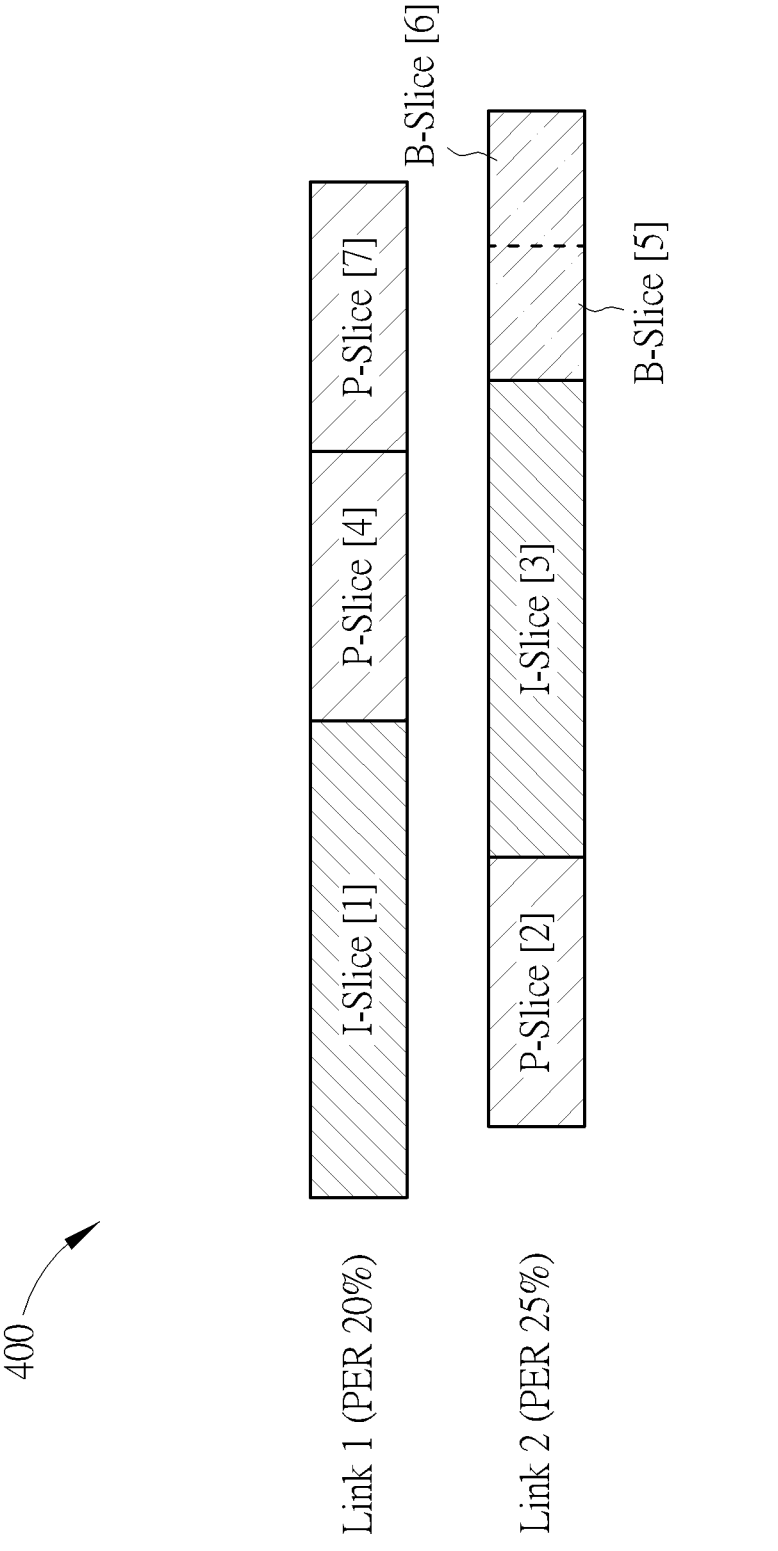
FIG. 4B shows a transmission method through dynamic dispatching MPDUs among multi-links according to another embodiment of the present disclosure.

FIG. 4A shows a transmission method 400 through dynamic dispatching MPDUs among multi-links according to another embodiment of the present disclosure. Like FIG. 3, and the PER of Link 1 and Link 2 are 25% and 45% respectively, which may indicate the difference of transmission conditions exceeding the mentioned threshold. Therefore, MPDUs corresponding to a high priority video slice or the most important slices like I-slices should be dispatched in Link 1 with a lower PER. MPDUs corresponding to a low priority video slice or the less important slices like P-slices can be dispatched partially in Link 1 if Link 1 is able to transmit more slices, and partially in Link 2 if Link 1 is unable to transmit remaining P-slices. If after dispatching I-slices, Link 1 is unable to transmit any more P-slices, then P-slices should be dispatched in Link 2. If after dispatching I-slices and P-slices, Link 1 and Link 2 do not have any more capacity to transmit additional slices, then remaining slices (such as B-slices) are not generated in Link 1 and/or Link 2 since they will be discarded in Link 1 and/or Link 2. B-slices can be dispatched according to the remaining capacity of Link 1 and Link 2. If after dispatching I-slices and P-slices, Link 2 is still able to transmit more slices, then B-slices can be dispatched in Link 2. If after dispatching I-slices and P-slices, both of Link 1 and Link 2 are not able to transmit more slices, then B-slices are not generated in Link 1 and/or Link 2 since they will be discarded. In this way, the loss of MPDUs in transmission may be recovered using the properties of I-slices and P-slices. In another embodiment, as shown in FIG. 4B, if the PER of Link 1 and Link 2 are similar, which may indicate the difference of transmission conditions being below the mentioned threshold, then the I-slices or MPDUs corresponding to high priority video slices can be dispatched evenly in Link 1 and Link 2 because the probability of losing MPDUs is similar in Link 1 and Link 2.

It should be noted that, in the embodiments depicted in FIGS. 3 and 4A/4B, the data of each video slice is encapsulated into a separate MAC Protocol Data Units (MPDUs). That is, each slice illustrated in the figures corresponds to a single MPDU. Additionally, the numerals presented in the figures can be served as examples of the sequence numbers for the MPDUs. For instance, in FIG. 4A, I-Slice [1] may represent MPDU 1, which has a sequence number of 1 and carries the data of the corresponding I-Slice [1], P-Slice [2] may represent MPDU 2, which has a sequence number of 2 and carries the data of the corresponding P-Slice [2], I-Slice [3] may represent MPDU 3, which has a sequence number of 3 and carries the data of the corresponding I-Slice [3], and so on. Furthermore, it can be observed from FIGS. 3 and 4A/4B that the sequence numbers of multiple MPDUs within a single PPDU are non-sequential. In the embodiment shown in FIG. 3, although MPDU 5 and MPDU 6 are not transmitted, the data of the B-Slice [5] and B-Slice [6] may be recoverable from the data of other slices. In an alternative embodiment, given that the data amount of a B-slice is typically small, MSDUs corresponding to multiple B-slices can be aggregated and encapsulated into a single MPDU. For example, B-Slice [5] and B-Slice [6] can be encapsulated into a single MPDU. Therefore, in an alternative embodiment, the data of single I slice is encapsulated as a single MPDU and the data of a single P slice is encapsulated as a single MPDU, however, the encapsulation of B-slices is not subject to this restriction.

Figure 5:
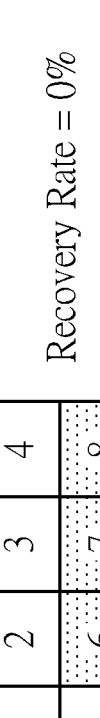
FIG. 5 shows a failed transmission scenario without dynamic dispatching MPDUs among multi-links.
Figure 5:
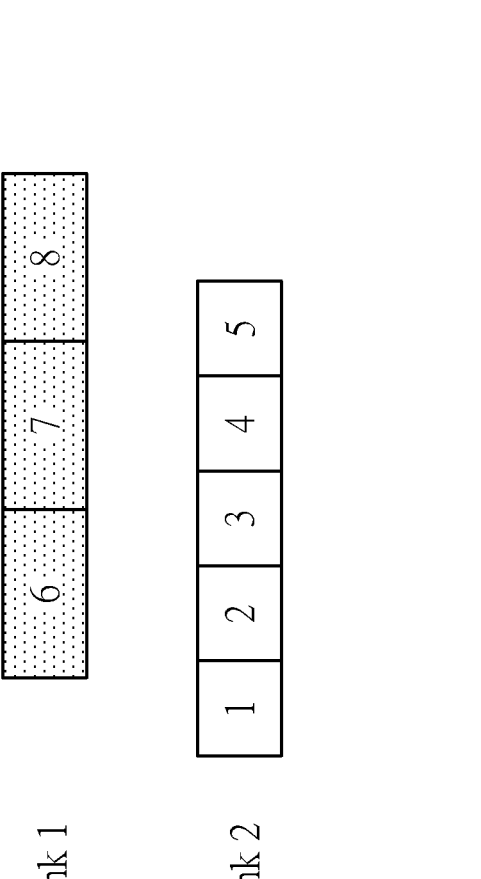

FIG. 5 shows a failed transmission scenario 500 without dynamic dispatching MPDUs among multi-links. As depicted in FIG. 5, two Physical Protocol Data Units (PPDUs) are transmitted over two distinct links. Specifically, the PPDU on Link 1 includes three MAC Protocol Data Units (MPDUs), while the PPDU on Link 2 comprises five MPDUs. Numerals are used to indicate the sequence numbers of the MPDUs, and in scenarios where each video slice is encapsulated into a single MPDU, these numerals may correspond to the slice sequence numbers of the corresponding video slice. For clarity and ease of understanding, the embodiment described herein assumes that the data of one video slice is encapsulated into one MPDU. However, in some embodiments, the scope of the present disclosure is not limited to this configuration.

In scenarios without the dynamic dispatching strategy proposed by the present disclosure, the sequence numbers of MPDUs within a single PPDU are sequential. For instance, MPDUs numbered 6, 7, and 8, represented as MPDU [6], MPDU [7], and MPDU [8], are transmitted over Link 1, while MPDUs numbered 1 through 5, represented as MPDU [1] through MPDU [5], are transmitted over Link 2. In this embodiment, each MPDU is associated with data from a distinct video slice. In some case, the data within MPDU [6] (such as, data of slice [6]) requires MPDU [2] (such as, data of slice [2]), MPDU [5] (such as, data of slice [5]), and MPDU [7] (such as, data of slice [7]) for successful recovery. Similarly, the data within MPDU [7] (such as, data of slice [7]) requires MPDU [3] (such as, data of slice [3]), MPDU [6] (such as, data of slice [6]), and MPDU [8] (such as, data of slice [8]) for successful recovery, and the data within MPDU [8] requires MPDU [4] and MPDU [7] for successful recovery. However, as illustrated in FIG. 5, consecutive transmission errors may occur on Link 1, due to interference. Consequently, the unavailability of MPDU [7] hinders the recovery of MPDU [6] and MPDU [8], and the absence of MPDU [6] and MPDU [8] likewise impedes the recovery of MPDU [7]. As a result, in the scenario presented, MPDU [6] through MPDU [8] cannot be recovered using the successfully received MPDUs, leading to a recovery rate of zero.

Figure 6:
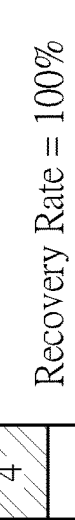
FIG. 6 shows a transmission method through dynamic dispatching MPDUs among multi-links according to another embodiment of the present disclosure.
Figure 6:
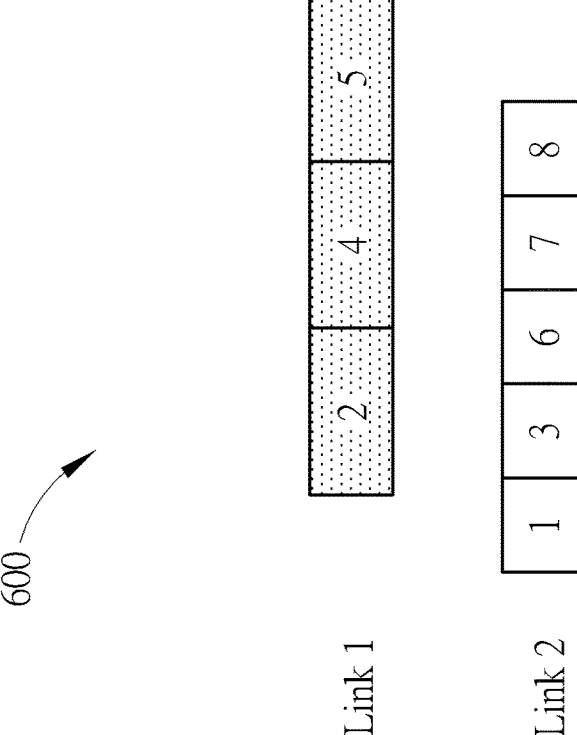

FIG. 6 shows a transmission method 600 through dynamic dispatching MPDUs among multi-links according to another embodiment of the present disclosure. In the embodiment, when a link of the plurality of links is detected to contain a continuous error, the plurality of MPDUs to be transmitted are dispatched alternately in different PPDUs, wherein sequence numbers of a plurality of MPDUs in a PPDU are arranged alternately or in an interleaved manner. In FIG. 6, the MPDUs are dispatched alternately. MPDUs 2, 4, 5 are transmitted in Link 1, and MPDUs 1, 3, 6, 7, 8 are transmitted in Link 2. Due to the high PER (such as, continuous error pattern) in Link 1, MPDUs 2, 4, 5 are lost. However, MPDU 2 can be recovered by MPUDs 1, 3, 6, MPDU 4 can be recovered by MPDUs 3, 8, and MPDU 5 can be recovered by MPDUs 1, 6. These MPDUs are all available, thus the recovery rate is 100%, better than the recovery rate 0% in FIG. 5. When the error pattern in one link is continuous (like FIG. 6), the MPDUs should be dispatched alternately. In another embodiment, when the error pattern in multi-links is discrete, the MPDUs should be dispatched continuously. That is, when a discrete error on the plurality of links is detected, the transmitter may dispatch the plurality of MPDUs to be transmitted sequentially in different PPDUs, wherein sequence numbers of a plurality of MPDUs in a PPDU are sequential.

Figure 7:
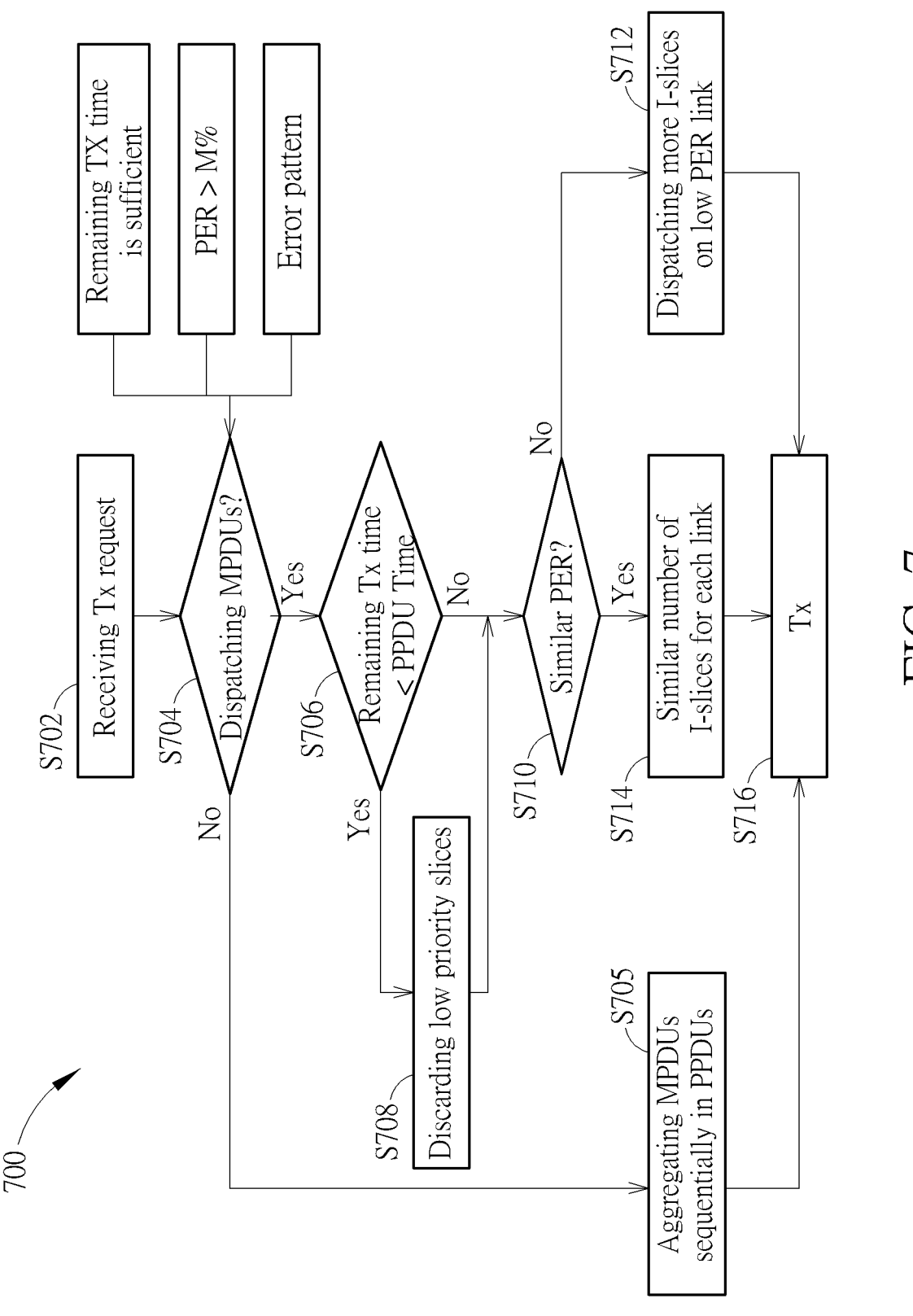
FIG. 7 is a flowchart of a transmission method through dynamic dispatching MPDUs among multi-links according to an embodiment of the present disclosure.

FIG. 7 is a flowchart of a transmission method 700 through dynamic dispatching MPDUs among multi-links according to an embodiment of the present disclosure. The transmission method 700 includes the following steps:

Step S702: receiving a transmission (TX) request;

Step S704: checking if MPDUs are to be dispatched; if yes, go to step S706; else, go to step S705;

Step S705: aggregating MPDUs sequentially in PPDUs; go to step S716;

Step S706: checking if remaining transmission time is smaller than PPDU time in current frame exchange; if so, go to step S708; else, go to step S710;

Step S708: discarding at least one MPDU with low priority. For example, at least one MPDU with lowest priority is discarded, which may correspond to the lowest priority or least important video slice such as B-slice;

Step S710: checking if the PER (one example of a transmission condition) is similar in different links; if so, go to step S714; else, go to step S712;

Step S712: dispatching more I-slices on low PER link during the generation of PPDUs to be transmitted through the plurality of links. In this embodiment, upon detecting a disparity in transmission conditions—such as Packet Error Rates (PERs)—across a multiplicity of communication links, a prioritization strategy is employed for the dispatching of MPDUs. Specifically, MPDU containing data from a video slice of higher priority is preferentially dispatched on the link exhibiting superior or better transmission characteristics. Conversely, MPDU containing data from a video slice of lower priority is dispatched on the link with relatively poorer transmission condition. This selective dispatching approach optimizes the use of the available links by aligning the priority of the video content with the reliability of the transmission path, thereby enhancing the overall quality of service for video streaming applications.

Step S714: dispatching similar number of I-slices on each link during the generation of PPDUs to be transmitted through the plurality of links. In the present embodiment, the difference in transmission conditions among the multiple links is below a predetermined threshold—indicative of similar link performance—an equitable distribution strategy is implemented for the transmission of MPDUs. This strategy enables the uniform dispatching of MPDUs, which are associated with high priority video slices, among the plurality of links. By adopting such a method, the embodiment ensures a balanced utilization of the links, thereby facilitating the maintenance of high priority video data transmission with a consistent level of quality and reducing the likelihood of over-reliance on any single link.

Step S716: transmitting the PPDUs through the plurality of links.

In the step S704, for example, the MPDUs are to be dispatched if remaining transmission time is sufficient to dispatch the MPDUs, if PER>M % (0<M<100) in at least one of the links, and/or if the observed error pattern on any link is continuous. For example, if a series of MPDUs transmitted over a particular link are observed to suffer transmission failures during a specified interval, this persistent failure of MPDU transmissions on the link indicates a possible degradation of the link quality and a continuous error pattern is detected. If it is determined that there is no need to dispatch MPDUs, then go to step S705. In step S705, PPDUs are generated by conventional transmission scheme wherein the sequence numbers of the MPDUs contained within each PPDU are sequential. In other words, the MPDUs are aggregated sequentially in PPDUs based on their assigned sequence numbers. If it is determined that the MPDUs need to be dispatched, then the method 700 goes to step S706. In step S706, check if the remaining transmission time is smaller than PPDU time. If yes, go to step S708; else, go to step S710. In step S708, discard low priority packet such as MPDU corresponding to B-slices.

In the step S710, check if the PERs of different links are similar. If yes, go to step S714; else, go to step S712. In step S712, during the generation of PPDUs, I-slices (or MPDUs corresponding to the I-slices) are dispatched on the link with low PER as long as the link has enough capacity, while B-slices, being less important, can be dispatched on the link with high PER. In step S714, since different links have similar PERs, similar number of I-slices are dispatched to the links. In step S716, the generated PPDUs are transmitted through the plurality of links. During data transmission, the transmitter is capable of determining or classifying the error pattern associated with each link, such as discrete or continuous error patterns. In one example, the receiver can convey to the transmitter which packets (MPDUs) have been successfully received by sending back a Block Acknowledgement (BA) frame. Consequently, the transmitter can determine the error pattern of the link based on this feedback. However, it should be noted that the scope of the present disclosure is not limited to this method of determining link error patterns.

Figure 8:
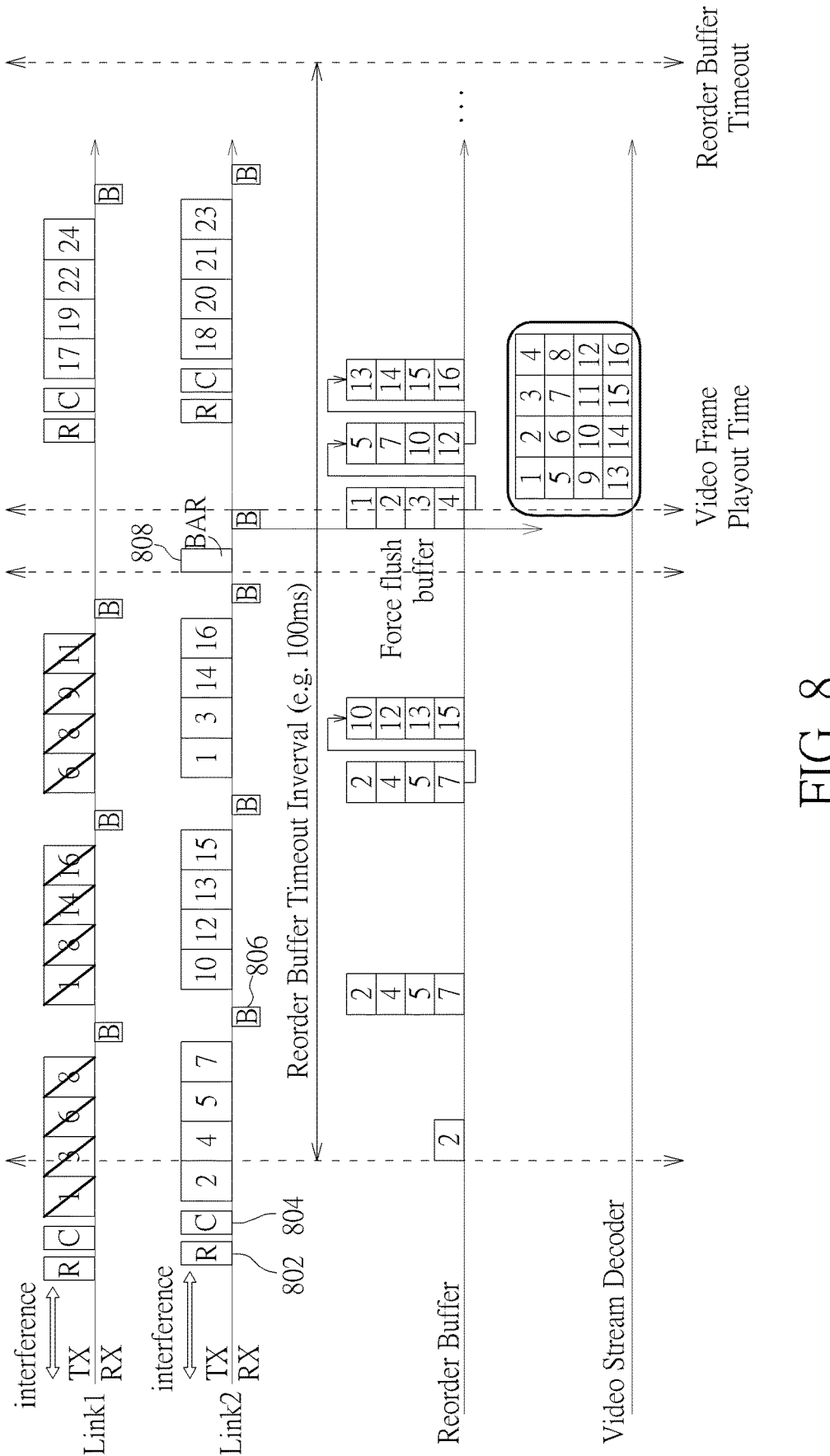
FIG. 8 is a schematic diagram of a transmission method through dynamic dispatching MPDUs among multi-links according to an embodiment of the present disclosure.

FIG. 8 is a schematic diagram of a transmission method through dynamic dispatching MPDUs among multi-links according to an embodiment of the present disclosure. The MPDUs are dispatched alternately in link 1 and link 2. Link 1 is a link with a high packet error rate (PER), which can be indicative of a continuous error pattern, and link 2 is a link with a low packet error rate (PER). Before transmission of data, the transmitter sends a request to send (RTS) frame 802 to the receiver, signaling the impending data payload. Subsequently, the receiver responds with a clear to send (CTS) frame 804 to inform the transmitter that the receiver is ready to receive the data. Following the exchange of RTS frame 802 and CTS frame 804, the transmission of alternately dispatched MPDUs commences. As depicted in FIG. 8, following the transmission of each Physical Protocol Data Unit (PPDU)—comprising an exemplary set of four MPDUs—a Block Acknowledgement (BA, also referred to as "B") frame 806 is transmitted to confirm the receipt of the data. In FIG. 8, the MPDUs fail to be transmitted successfully through link 1 due to the high PER in link 1. In one embodiment, when the time approaching an estimated videoframe playout time, a block acknowledgement request (BAR) frame 808 is deliberately sent on link 2 to force the receiver to refresh its reorder buffer, and terminate or conclude the transmission of MPDUs within the current frame exchange, and enter next frame exchange. The BAR frame 808 should be sent on link 2 but not link 1 due to the high PER in link 1 and the low PER in link 2. Upon refreshing the reorder buffer, all successfully received MPDUs are reordered according to their respective sequence numbers. It is then determined that MPDUs 6, 8, 9, and 11 are missing from the transmission. However, the MPDU 6 can be recovered by MPDUs 2, 5, 7, 10, the MPDU 8 can be recovered by MPDUs 4, 7, 12, the MPDU 9 can be recovered by MPDUs 5, 10, 13, the MPDU 11 can be recovered by MPDUs 7, 10, 12, 15. Consequently, the recovery rate is rendered at 100% due to the alternate dispatching of MPDUs and the issuance of a BAR frame 808 to refresh the reorder buffer, effectively terminating the transmission of MPDUs on both links and preventing useless retransmissions of lost MPDUs. In one embodiment, the BAR frame 808 is transmitted to the receiver before the video frame playout time, to enhance the smoothness of video playout without retransmission all the time due to failed MPDUs. For instance, the BAR frame 808 can be transmitted in advance of the estimated video frame playback time by a predetermined duration.

Figure 9:
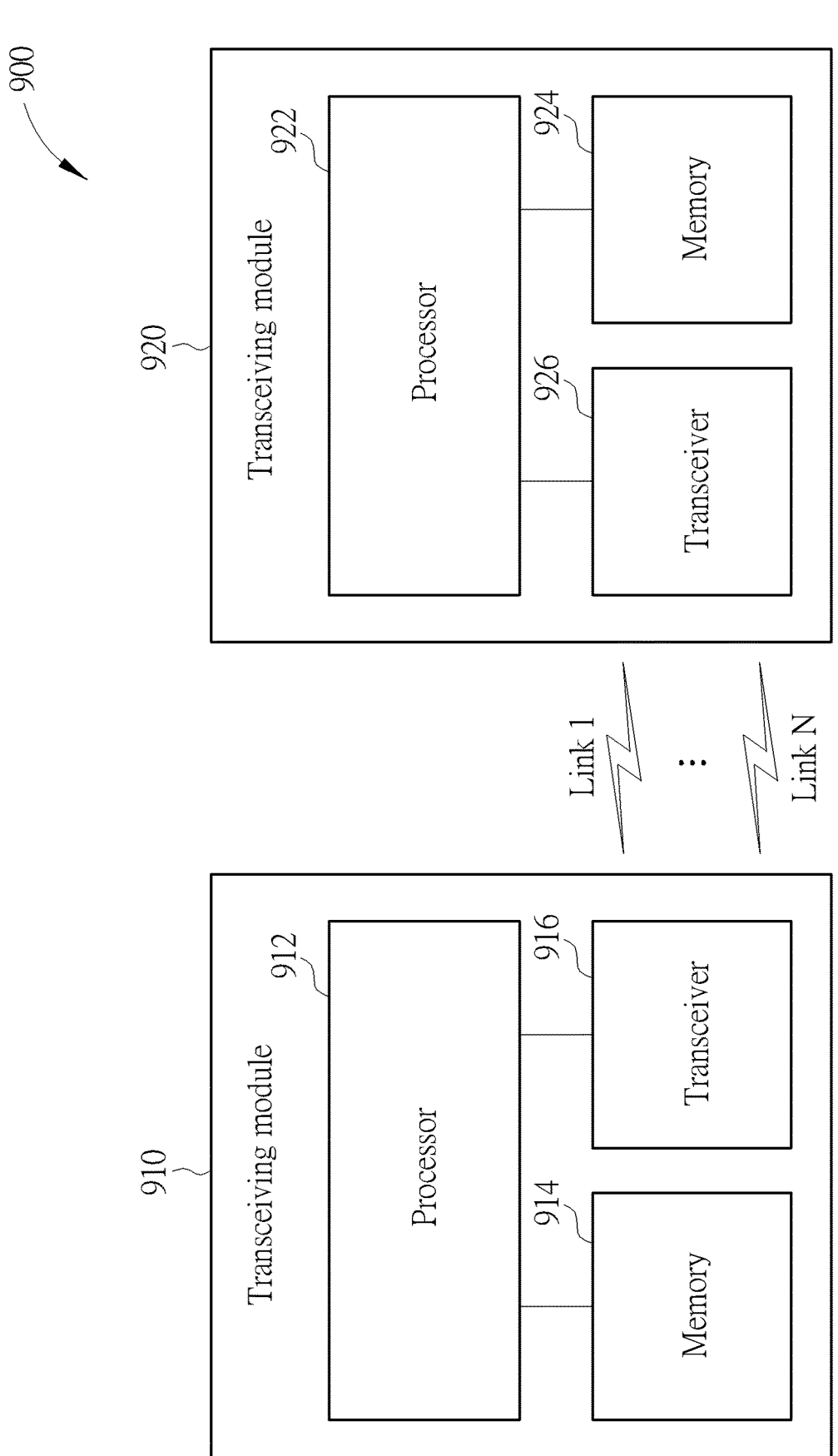
FIG. 9 is a block diagram of video transmission system for transmitting video data through dynamic dispatching MPDUs among multi-links according to an embodiment of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, and methods described herein pertaining to video transmission through a plurality of links, including the various schemes described above with respect to various proposed designs, concepts, and schemes described above as well as processes described below. Each of apparatus 910 and apparatus 920 may be a communication entity capable of communicating with each other using various proposed schemes in accordance with the present disclosure, for instance, apparatus 910 and 920 may be an MLD (multi-link device).

Each of the apparatus 910 and the apparatus 920 may include at least some of those components shown in FIG. 9 such as a processor 912 and a processor 922, respectively, for example. Each of the apparatus 910 and the apparatus 920 may further include one or more other components not pertinent to the proposed scheme of the present disclosure (e.g., internal power supply, display device and/or user interface device), and, thus, such component(s) of the apparatus 910 and the apparatus 920 are neither shown in FIG. 9 nor described below in the interest of simplicity and brevity.

In one aspect, each of the processors 912 and 922 may be implemented in the form of one or more single-core processors, one or more multi-core processors, one or more RISC processors or one or more CISC processors. That is, even though a singular term "a processor" is used herein to refer to the processor 912 and the processor 922, each of the processor 912 and the processor 922 may include multiple processors in some implementations and a single processor in other implementations in accordance with the present disclosure.

In some implementations, the apparatus 910 (such as the transmitter mentioned above) may also include a transceiver 916 coupled to processor 912. The transceiver 916 may be capable of wirelessly transmitting and receiving data. In some implementations, the apparatus 920 (such as the receiver mentioned above) may also include a transceiver 926 coupled to processor 922. The transceiver 926 may be capable of wirelessly transmitting and receiving data. The transceiver 916 and the transceiver 926 may wirelessly communicate with each other over one or more of multiple links link 1~link N, with N being a positive integer greater than 1, such as a first link and a second link.

In some implementations, the apparatus 910 may further include a memory 914 coupled to the processor 912 and capable of being accessed by the processor 912 and storing data therein. In some implementations, the apparatus 920 may further include a memory 924 coupled to the processor 922 and capable of being accessed by the processor 922 and storing data therein.

Figure 10:
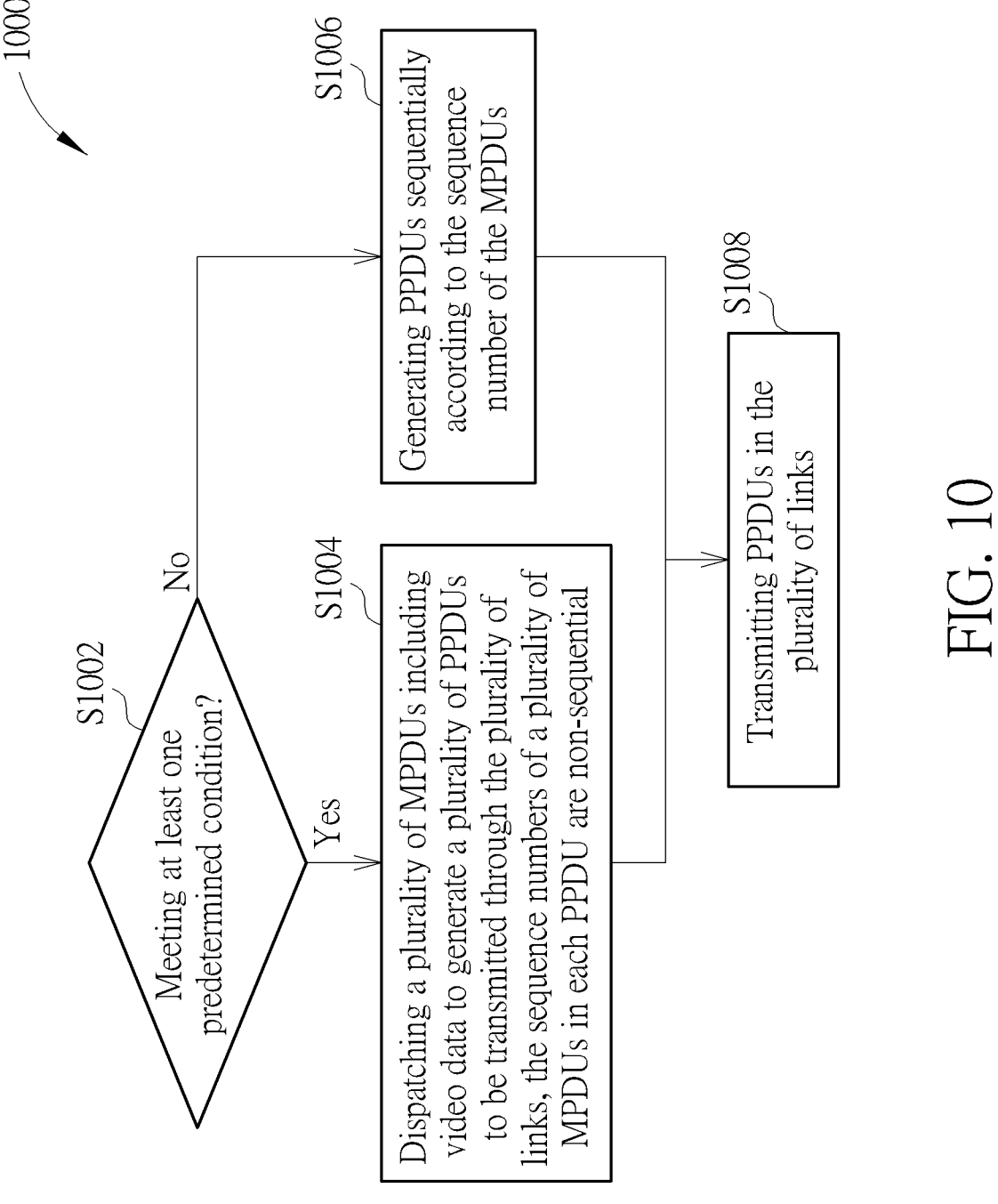
FIG. 10 is a flow chart of a transmission method through dynamic dispatching MPDUs among multi-links according to an embodiment of the present disclosure.

FIG. 10 is a flow chart of a transmission method 1000 through dynamic dispatching MPDUs among multi-links according to an embodiment of the present disclosure. The transmission method 1000 includes the following steps:

Step S1002: checking if at least one predetermined condition is met. If so, go to step S1004; else, go to step S1006;

Step S1004: dispatching a plurality of MPDUs including video data to generate a plurality of PPDUs to be transmitted through the plurality of links, wherein the sequence numbers of a plurality of dispatched MPDUs in each PPDU are non-sequential;

Step S1006: generating PPDUs sequentially according to the sequence number of the MPDUs; and Step S1008: transmitting PPDUs in the plurality of links.

In the step S1002, check if at least one predetermined condition is met. The at least one predetermined condition may include whether the remaining TX time is sufficient, whether the PER of a link is larger than M % (0<M<100), and whether the error pattern of the transmission is continuous. If at least one of the conditions is met, then go to step S1004 to dispatch a plurality of MPDUs including video data to generate a plurality of PPDUs to be transmitted through the plurality of links, wherein the sequence numbers of a plurality of dispatched MPDUs in each PPDU are non-sequential. If none of the predetermined conditions is met, then go to step S1006 to generate PPDUs sequentially according to the sequence number of the MPDUs. After performing step S1004 or step S1006, go to step S1008 to transmit the PPDUs on the plurality of links.

In the present disclosure, the MPDUs are dispatched according to the error pattern, remaining transmission time, and/or transmission condition. In this way, the recovery rate of MPDUs can be improved. Therefore, the present disclosure improves the quality of video transmission through dynamic dispatching MPDUs among multi-links.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video transmission method for transmitting video data through a plurality of links, comprising:

in response to determining that at least one predetermined condition related to the plurality of links is met, dispatching a plurality of Media Access Control (MAC) protocol data units (MPDUs) including video data to generate a plurality of physical protocol data units (PPDUs) to be transmitted through the plurality of links, wherein sequence numbers of a plurality of MPDUs in each of the plurality of PPDUs are non-sequential;

transmitting the plurality of PPDUs through the plurality of links;

wherein the plurality of links comprise a first link and a second link, the plurality of PPDUs comprise a first PPDU transmitted through the first link and a second PPDU transmitted through the second link, sequence numbers of a first MPDU and a second MPDU sequentially encapsulated in the first PPDU are non-sequential, and a sequence number of a third MPDU encapsulated in the second PPDU and a sequence number of one of the first MPDU and the second MPDU encapsulated in the first PPDU are sequential.

2. The video transmission method of claim 1, further comprising:

encapsulating a plurality of MAC service data units (MSDUs) corresponding to a single video slice into a single MPDU.

3. The video transmission method of claim 2, wherein in response to determining at least one predetermined condition related to the plurality of links is met, dispatching the plurality of MPDUs including video data to generate the plurality of PPDUs to be transmitted through the plurality of links comprises:

in response to determining that a difference of transmission conditions among the plurality of links exceeds a threshold, dispatching an MPDU of the plurality of MPDUs corresponding to a high priority video slice on a link with a relatively better transmission condition.

4. The video transmission method of claim 2, wherein in response to determining that at least one predetermined condition related to the plurality of links is met, dispatching the plurality of MPDUs including video data to generate the plurality of PPDUs to be transmitted through the plurality of links comprises:

in response to determining that a difference of transmission conditions among the plurality of links is below a threshold, evenly dispatching MPDUs of the plurality of MPDUs corresponding to high priority video slices across the plurality of links.

5. The video transmission method of claim 4, wherein the transmission conditions comprise a packet error rate (PER) and/or a received signal strength indicator (RSSI).

6. The video transmission method of claim 4, wherein the video slices comprise an intra slice (I slice), a predictive slice (P slice), and a bi-directional predictive slice (B slice), the I slice has a higher priority than the P slice, and the P slice has a higher priority than the B slice.

7. The video transmission method of claim 2, wherein:

in response to determining that a remaining transmission time of the plurality of links is insufficient to transmit all of the plurality of MPDUs to be transmitted in current frame exchange, at least one MPDU of the plurality of MPDUs corresponding to a low priority video slice is not generated in the plurality of PPDUs.

8. The video transmission method of claim 1, wherein in response to determining that at least one predetermined condition related to the plurality of links is met, dispatching the plurality of MPDUs including video data to generate the plurality of PPDUs to be transmitted through the plurality of links comprises:

in response to determining that a link of the plurality of links is detected to contain a continuous error, dispatching the plurality of MPDUs including video data alternately in different PPDUs, wherein sequence numbers of the plurality of dispatched MPDUs in each PPDU are arranged alternately.

9. The video transmission method of claim 8, further comprising:

in response to determining that a discrete error on the plurality of links is detected, generating PPDUs sequentially according to the sequence number of the MPDUs.

10. The video transmission method of claim 1, further comprising:

estimating a video frame playout time of a receiver, and sending a block acknowledgement request (BAR) frame before the video frame playout time to request the receiver to forcefully refresh its reorder buffer.

11. An apparatus for transmitting video data through a plurality of links, comprising:

a transceiver configured to communicate wirelessly; and a processor coupled to the transceiver and configured to perform operations, wherein the operations comprising:

when at least one predetermined condition related to the plurality of links is met, dispatching a plurality of Media Access Control (MAC) protocol data units (MPDUs) including video data to generate a plurality of physical protocol data units (PPDUs) to be transmitted through the plurality of links, wherein sequence numbers of a plurality of MPDUs in each of the plurality of PPDUs are non-sequential;

transmitting, via the transceiver, the plurality of PPDUs through the plurality of links;

wherein the plurality of links comprise a first link and a second link, the plurality of PPDUs comprise a first PPDU transmitted through the first link and a second PPDU transmitted through the second link, sequence numbers of a first MPDU and a second MPDU sequentially encapsulated in the first PPDU are non-sequential, and a sequence number of a third MPDU encapsulated in the second PPDU and a sequence number of one of the first MPDU and the second MPDU encapsulated in the first PPDU are sequential.

12. The apparatus of claim 11, wherein the processor is further configured to perform operations comprising:

encapsulating a plurality of MAC service data units (MSDUs) corresponding to a single video slice into a single MPDU.

13. The apparatus of claim 12, wherein when at least one predetermined condition related to the plurality of links is met, dispatching the plurality of MPDUs including video data to generate the plurality of PPDUs to be transmitted through the plurality of links comprises:

when a difference of transmission conditions among the plurality of links exceeds a threshold, dispatching an MPDU of the plurality of MPDUs corresponding to a high priority video slice on a link with a relatively better transmission condition.

14. The apparatus of claim 12, wherein when at least one predetermined condition related to the plurality of links is met, dispatching the plurality of MPDUs including video data to generate the plurality of PPDUs to be transmitted through the plurality of links comprises:

when a difference of transmission conditions among the plurality of links is below a threshold, evenly dispatching MPDUs of the plurality of MPDUs corresponding to high priority video slices across the plurality of links.

15. The apparatus of claim 14, wherein the transmission conditions comprise a packet error rate (PER) and/or a received signal strength indicator (RSSI).

16. The apparatus of claim 14, wherein the video slices comprise an intra slice (I slice), a predictive slice (P slice), and a bi-directional predictive slice (B slice), the I slice has a higher priority than the P slice, and the P slice has a higher priority than the B slice.

17. The apparatus of claim 12, wherein when a remaining transmission time of the plurality of links is insufficient to transmit all of the plurality of MPDUs to be transmitted in current frame exchange, at least one MPDU of the plurality of MPDUs corresponding to a low priority video slice is not generated in the plurality of PPDUs.

18. The apparatus of claim 11, wherein when at least one predetermined condition related to the plurality of links is met, dispatching the plurality of MPDUs including video data to generate the plurality of PPDUs to be transmitted through the plurality of links comprises:

when a link of the plurality of links is detected to contain a continuous error, dispatching the plurality of MPDUs including video data alternately in different PPDUs, wherein sequence numbers of a plurality of dispatched MPDUs in each PPDU are arranged alternately.

19. The apparatus of claim 18, wherein the processor is further configured to perform operations comprising:

when a discrete error on the plurality of links is detected, generating PPDUs sequentially according to the sequence number of the MPDUs.

20. The apparatus of claim 11, wherein the processor is further configured to perform operations comprising:

estimating a video frame playout time of a receiver, and sending a block acknowledgement request (BAR) frame before the video frame playout time to request the receiver to forcefully refresh its reorder buffer.

\* \* \* \* \*